United States Patent
Killmann

(10) Patent No.: US 9,424,635 B2
(45) Date of Patent: Aug. 23, 2016

(54) METHOD AND DEVICE FOR INDIVIDUAL GRAIN SORTING OF OBJECTS FROM BULK MATERIALS

(75) Inventor: Dirk Killmann, Bergheim (DE)

(73) Assignee: STEINERT ELEKTROMAGNETBAU GMBH, Cologne (DE)

( * ) Notice: Subject to any disclaimer, the term of this patent is extended or adjusted under 35 U.S.C. 154(b) by 632 days.

(21) Appl. No.: 13/988,445

(22) PCT Filed: Nov. 24, 2011

(86) PCT No.: PCT/DE2011/002027
§ 371 (c)(1),
(2), (4) Date: May 23, 2013

(87) PCT Pub. No.: WO2012/089185
PCT Pub. Date: Jul. 5, 2012

(65) Prior Publication Data
US 2013/0229510 A1     Sep. 5, 2013

(30) Foreign Application Priority Data
Nov. 25, 2010   (DE) .................. 10 2010 052 338

(51) Int. Cl.
*G01N 21/00*  (2006.01)
*G06T 7/00*  (2006.01)
(Continued)

(52) U.S. Cl.
CPC .......... *G06T 7/0004* (2013.01); *B07C 5/3416* (2013.01); *B07C 5/3425* (2013.01)

(58) Field of Classification Search
CPC .. B07C 5/3416; B07C 5/3425; G06T 7/0004
USPC ........................................ 348/91; 356/237.1
See application file for complete search history.

(56) References Cited

U.S. PATENT DOCUMENTS 5,917,927 A * 6/1999 Satake ................. G06T 7/0004
356/237.1
6,914,678 B1   7/2005 Ulrichsen et al.
(Continued)

FOREIGN PATENT DOCUMENTS

EP     0550944 A1   7/1993
EP     0737112      4/2002
(Continued)

OTHER PUBLICATIONS

International Search Report for Application No. PCT/DE2011/002027 dated May 30, 2012.

*Primary Examiner* — Farzana Hossain
(74) *Attorney, Agent, or Firm* — Cohen & Hildebrand, PLLC

(57) ABSTRACT

Individual grain sorting of objects from bulk materials (3) on a conveying device (1) and an actuable discharge unit (2) which separates into fractions, the height distribution of the object (3.1) and the propagation of a light source (4) are advantageously used as sorting criterion, wherein a light-band (4.1) is projected transversely with respect to a conveying direction of the bulk material (3) on a plane of the conveying device (1), the objects (3.1) are moved through under the light-band (4.1), a first part (4.1.1) of the light is reflected, a second part (4.1.2) enters again at an entry point (11.1), is scattered and exits again at an exit point (3.1.2), a scattered propagation (B) is detected by a camera (9), and contiguous regions are identified in buffered rows (13), and the measured values are subjected to an evaluation and are combined to form characteristic values, and the discharge unit (2) is actuated in dependence on preset sorting parameters.

8 Claims, 2 Drawing Sheets

(51) Int. Cl.
  *B07C 5/34* (2006.01)
  *B07C 5/342* (2006.01)

(56) References Cited

U.S. PATENT DOCUMENTS 7,858,893 B1 * 12/2010 Haff ................... B07C 5/3425
                                                                209/576
2009/0021751 A1 * 1/2009 Jonasson Bjarang . B07C 5/3425
                                                                356/601
2009/0258684 A1 * 10/2009 Missotten ............ A01D 41/127
                                                                460/5
2010/0290032 A1   11/2010 Bugge
2011/0202169 A1 * 8/2011 Koehler ................. B07C 5/342
                                                                700/215

FOREIGN PATENT DOCUMENTS

| EP | 1830176 A1 | 9/2007 |
| WO | 2006038876 | 4/2006 |
| WO | 2012001133 A2 | 1/2012 |

* cited by examiner

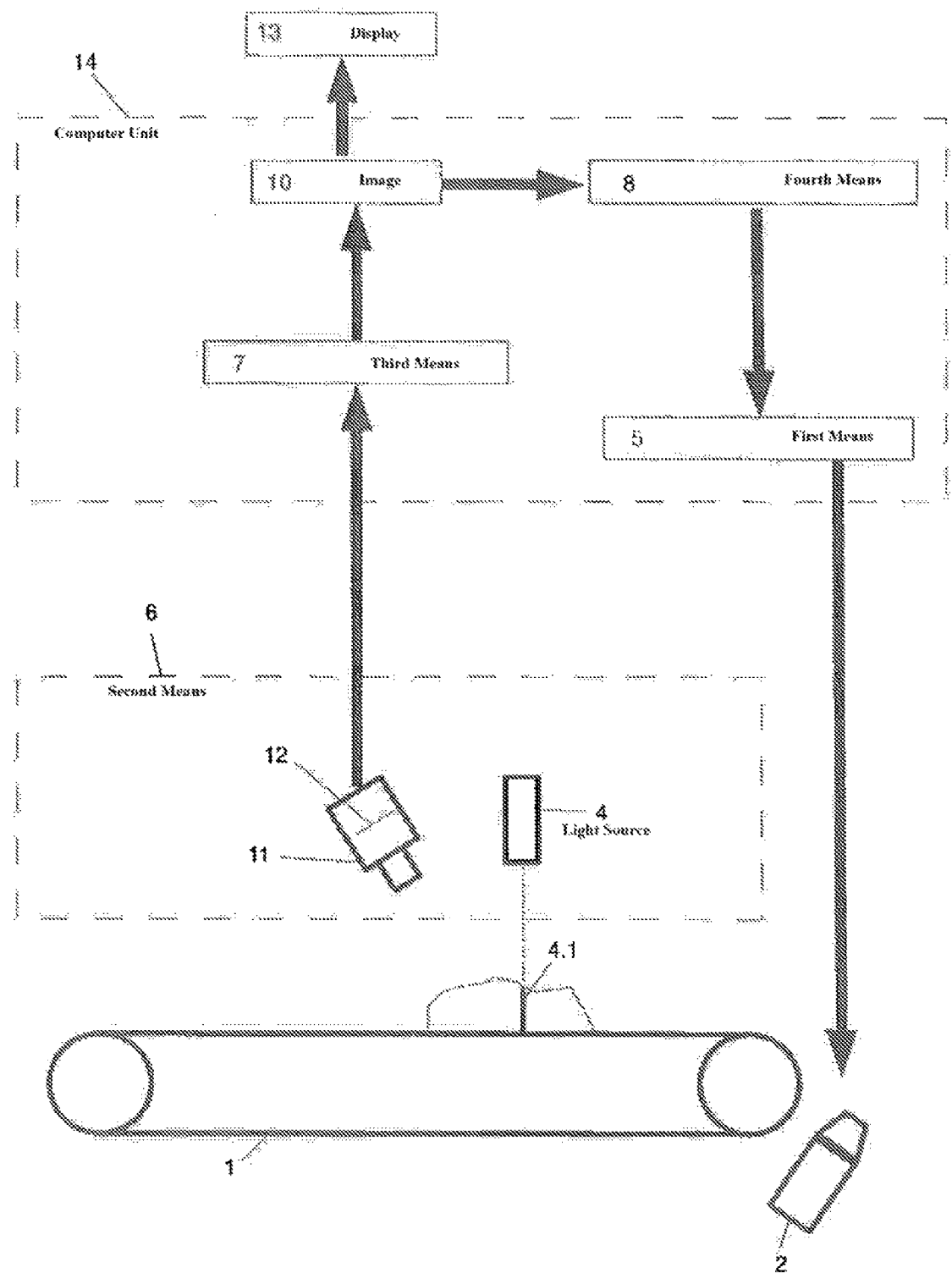

METHOD AND DEVICE FOR INDIVIDUAL GRAIN SORTING OF OBJECTS FROM BULK MATERIALS

This is an application filed under 35 USC §371 of PCT/DE2011/002027, claiming priority to DE 10 2010 052 338.0 filed on Nov. 25, 2010.

BACKGROUND OF THE INVENTION (1) Field of the Invention

The invention relates to a method and a device for individual grain sorting of objects from bulk materials, in particular broken mineral ores, crushed and whole plastics from waste materials, comminuted wood on a conveying device having an actuable discharge unit which separates into fractions the bulk material identified according to type.

(2) Description of Related Art

Such methods and sorting devices are known in process engineering.

In addition to systems in which the material to be sorted is X-rayed and is then sorted using the composition of the emitted radiation as a sorting criterion, systems are also known which use the intensity and spectral composition of visible light as so-called colour sorting.

Thus, in accordance with EP 0 737 112 B1/DE 694 30 386 T2, by means of
 a conveying device with a uniformly contrasting background for the particles to be conveyed and sorted, and a controlled light mounted above it,
 a position sensor for determining the position of the particles with a logic for sub-dividing a viewing area into a matrix of cells with a number of pixels with a first controller,
 an image detector for acquiring a colour image,
 an image processor for receiving data from the viewing area and
 a separating device activated by a second controller,
scrap particles are sorted by their colour on the basis of difference signals.

This system is based on the proven technological process of sensor-driven sorting techniques, such as data acquisition—data computation—sorting decision—control of a conveying device. This solution is suitable for sorting scrap materials if the colour is used as a sorting criterion. If the material colour that can be used as a sorting criterion is covered by a layer of dirt or materials, then these systems are not applicable.

In the source document "http://www.besttoratec.com/sorter/Helius_laser-sorter.htm" a line laser has already been described as a lighting means, however not for a 3D-recognition process, but as an emitter for a colour camera.

In addition, page 3 of the source "http://www.sick.fi/ch/products/machinevision/ruler/de.too lboxpar.0008.file.tmp/ProduktinformationRuler.pdf" discloses the use of a laser line width as "scattered laser light" for sorting purposes.

According to this article, in classification applications in the timber industry both form and surface properties of objects are to be evaluated. In addition to the measurement of the object outline a grey-scale image and an image with the surface information can be generated at the same time (scattered laser light effect or tracheid effect). In the timber classification example the shape of the timber product, which can be geometrically identified in advance, is measured, which means only errors such as knots and resin pockets can be detected. With this information the timber items are then sorted according to the aforementioned quality features—not in accordance with indeterminable shapes.

While in such applications it is true that the timber is subject to high-speed measurement, but not according to a sorting criterion based on the detection of indeterminably occurring shapes of the sorted object.

Furthermore, from US 2010 0 290 032 A1 in order to sort plastic, fabric, foodstuffs, paper, glass, metal, it is known to use a steered laser in the infrared spectrum by means of a rotating mirror wheel, but which cannot continuously take a measurement at all positions, because the information is sent sequentially through the mirror to the local point sensor. This solution only permits detection based on a spectral composition.

A review of U.S. Pat. No. 6,914,678 B1 discloses lamps emitting IR or visible light for the automatic detection and sorting of types of plastic, in particular, in waste products. A mirror is used to deflect the IR or visible light and a camera as a detection unit. Although several wavelengths can be detected at the same time, it is only possible however to construct a non-IR spectrum or the visible spectrum of the reflected light, and only spectral differences are detected.

In another subject area, namely the detection of differences in the tissue of living organisms such as humans or animals, according to WO 2006/038 876 A1 non-visible lasers such as "monolithic lasers" with rapidly varying wavelength are used as a system for generating O (optical) C (coherence) T (tomography) images by the method of interferometry. This system is used for the detection of intervals by modulating the wavelength. It can also be applied in materials inspection, for the detection of cracks or irregularities in the material. By using a modulatable point laser with deflecting mirrors only the internal structure can be detected, but not the surface.

BRIEF SUMMARY OF THE INVENTION

The assessment of this prior art teaches that in order to detect objects, on the one hand, the colour of surfaces is used as a sorting criterion and on the other hand, the internal structure of an object is detected. If the material colour that can be used as a sorting criterion is covered by a layer of dirt or materials, then these systems are not applicable.

Contrary to this, while maintaining in principle the technological process of sensor-based sorting techniques, the object of the invention is to create a method and a device which can be efficiently used for individual grain sorting of objects from bulk materials, in particular broken mineral ores, crushed and whole plastics from waste materials, comminuted wood, but also comprising both metallic and mineral-based ingredients, said method and device also using a multi-dimensional sorting criterion such as the height distribution of a sorting object and the propagation of a light source on the polygonal surface of a sorting object which cannot be identified in advance, and applying known cameras.

According to the invention, in order to identify material differences the method uses the light propagation characteristics in the material surface of the objects to be sorted in such a manner that for this purpose, the light of a line laser is projected on a plane of a conveying device such as a conveyor belt or chute, at right angles to the conveying direction, the objects to be sorted and lying on this plane are passed through under the light, one part of the light is reflected from the surface of the objects, another part, depending on the topological nature of the surface of the objects, enters the upper polygonal material geometries, is scattered and emerges again near to an entry site, and such a reflected propagation is visibly detected in a definable width of a laser line. This is based on the physical fact that optically transparent objects exhibit a broad reflection of a laser line and optically opaque objects exhibit a narrow one.

Thus the core idea of the method focuses on the steps that the sorting criteria used are the height distribution of the objects to be sorted on a conveying device and the propagation of a light band which illuminates in a temporally constant manner a polygonal surface of the individual object which cannot be identified in advance, the light band is projected on a plane and a first part of the generated light is reflected from the surfaces of the objects and a second part, depending on the topological or polygonal nature of the surface of the individual object, enters the respective upper polygonal material geometry at an entry point, is then scattered and emerges again at an exit point, wherein the light travels along a path under the surface of the material, such a reflected and scattered propagation is optically detected in a grid pattern with one step size per segment along the light band in a location- and time-referenced manner as digital signals from a plurality of sequentially recorded rows according to the principle of laser triangulation or polygonization, resolved and determined at a height of a measurement site, the detected/detectable propagation of the light band is captured and displayed as a buffered image and contiguous regions are identified in the buffered rows for measured values as an object image associated with the respective real object and the boundaries of the real objects are identified in the buffered image, the data from all measured values of an object image of the real object are converted to feature values of the object images, and depending on preset sorting parameters for the feature values, a discharge unit of the conveying device is activated.

The width of the laser line is detected by a camera in a spatially resolved manner with a dimensioned frequency according to the principle of laser triangulation applied and thus used according to the invention.

This laser triangulation means that fixed points on the grains of the bulk material, the shape of which cannot be determined in advance, are identified and measured with regard to their position in a reference system according to the principles of trigonometry, namely via the dimensions of widths and lengths of individual quasi-trigonometric points and their quasi-azimuths.

The camera records the detected laser width row-by-row and in a time-referenced manner via an interface in the form of a camera image. This is evaluated by means of software in a calculator unit.

Depending on the preset sorting parameters the software controls a discharge unit such as the said conveying device, which separates the flow of a bulk material into at least two fractions.

The method thus defines as a sorting criterion a width of the laser line, locally resolved, and in addition a height of a measurement point at which the width of the laser line has been determined.

This combination is surprisingly well suited, in particular in the case of bulk materials with mineral-based constituents, to individual grain sorting of e.g. bulk materials with constituents of quartz and feldspar.

On the other hand, the method is also applicable to bulk materials with components of scrap, such as shiny metals, which produce a narrower reflection than plastics.

The advantage obtained according to the invention relative to the techniques evaluated above with the disadvantages of e.g. colour sorting, is that the light transmittance of the surface, which is dependent on the penetration depth, can be used as a sorting criterion for an object to be sorted. At the same time the topological composition of the surfaces of the objects, which cannot be identified in advance, is rendered identifiable.

Differently structured minerals, for example, such as quartz or feldspar, or differently shaped pieces of scrap can therefore be separated based on their shape.

This therefore extends to include the feature of "product history" as a sorting criterion, the fact that in many cases sorting cannot be carried out with colour alone, such as distinguishing airbag cartridges from scrap metals subject to stress in a shredder, since both are the same colour. Due to the way they function in a motor vehicle the airbag cartridges always have an identical or similar shape which is different to other pieces of scrap, and which is not significantly altered when placed under stress in the shredder.

The additional advantage of the laser triangulation applied here according to the invention is that the material to be sorted can be clearly demarcated from a conveyor belt by means of sensors, since in each case the material extends above the top of the conveyor belt. In the case of e.g. colour detection, by contrast, a feature must be created to distinguish between the colour of the conveyor belt and the colour of the object. This is not always feasible without additional effort, since the conveyor belt typically tends to match the colour of the material flow.

Compared to the known methods and devices the invention stands out due to the fact that, by means of an effect arising from the novel combination of the so-called halo effect and the height triangulation process, it identifies in more than merely spectral differences of objects to be separated for a more efficient sorting.

Developed further, the method sequence is characterized by the sorting criterion of a height distribution of the objects to be sorted on the conveying device and by the propagation of a light band of a light source on a polygonal surface of the individual object which is not identifiable in advance, and by means for actuating the discharge unit by the specific steps of a) the temporally constantly illuminated light band of the light source is projected at right angles to the conveying direction of the bulk material on the plane of the conveying device, b) the real objects to be sorted lying on this plane are moved through under the light band, c) the first part of the light produced by the light band is reflected by the surfaces of the objects and the second part, depending on the topological or polygonal composition of the surface of the individual object, enters the respective upper polygonal material geometry at the entry point, is then scattered and emerges again at the exit point, wherein the light travels along a path under the surface of the material, d) such a reflected and scattered propagation is optically detected and buffered in the grid with a step size and in a location and time-referenced manner as digital signals from a plurality of sequentially recorded rows, wherein the propagation of the light band is detected by the camera according to the principle of laser triangulation or polygonization at a frequency of at least 100 Hz, resolved with a maximum value of 10 mm/pixel, preferably from 0.1 to 10 mm/pixel, and determined at a height of a measuring point and the detected/detectable propagation of the light band is recorded at least row-by-row and at least in a time-referenced manner and displayed in the image in buffered form, in these buffered rows contiguous regions are identified on the basis of adjustable thresholds for measured values as an object image associated with the real object, by the boundaries of the real objects being identified in the buffered image by image processing methods, e) the data from all measured values of the object image are contiguously subjected to a statistical analysis and converted into feature values of the object images and thus also of the real objects, and f) depending on sorting parameters for the feature values, the discharge unit of the conveying device is actuated, which separates the bulk material into at least two fractions of real objects of the bulk material.

The method is advantageously applied and extended, if a line laser is used as a light source and a laser line as the light band, the step size along the light band can be 0.1 to 10 mm per segment, the spatial resolution of the light band is in a range from 0.1 to 10 mm/pixel, the associated object image is identified by image processing methods in the buffered image and/or a surface sensor is used for the camera operating according to the principle of laser triangulation.

For the advantageous implementation of the method a program is used as the software for a computer unit controlling the method, which has at least one of the following functions:

optical detection of the propagation of the light reflected or scattered by the surfaces of the objects in a grid with a specific step width along the light band, location- and time-referenced buffering in a plurality of sequentially recorded rows as digital signals, identification of contiguous regions in these buffered rows and analysis on the basis of adjustable thresholds for measured values as object images and activation of the discharge unit for separating the objects into fractions.

These functions incorporate data or features for using the light source, such as line laser with light band of the line laser, step widths and rows, heights of a measuring point, and a time-referenced recording, buffering and display in an image in dimensioned or digitized form, namely to guarantee the requirements on the method resulting from Claims 1 to 7 and the relevant features of the device.

Accordingly, a device for carrying out the method is used, which comprises a) a conveying device with first means for sensor-based recording of signals for actuating the discharge unit with the first means, b) a light source which can be implemented as a line laser with a stationary optical element for beam shaping for generating a light band which can be implemented as a laser line which is continuously illuminated during the exposure, c) second means for detecting the reflected propagation in a definable width of the light band, d) third means for buffering location- and time-referenced digital signals from a plurality of sequentially recorded rows and displaying them in an image e) fourth means for identifying contiguous regions on the basis of adjustable thresholds for measured values of the objects as signals for sorting parameters, by means of which the first means can be controlled, wherein (f) the first to the fourth means each have at least one of the following elements:

a sensor, a module for the grid, a computer unit for recording values, processing/analysis of the values into data and output of signals and for using the program and/or the camera.

The invention will now be explained on the basis of the drawings as an exemplary embodiment.

DETAILED DESCRIPTION OF THE INVENTION

Figure 1:
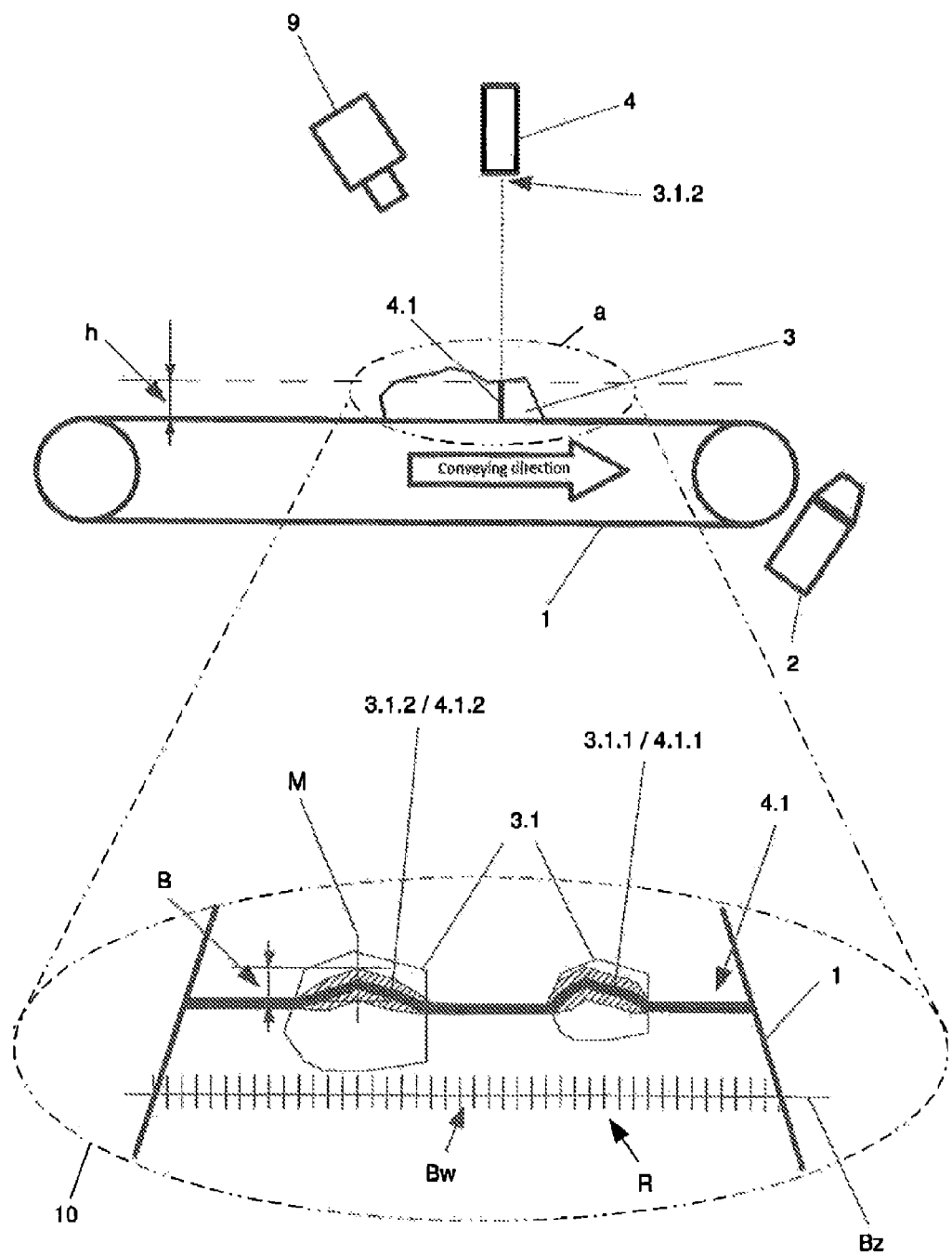
FIG. 1 the representation of the method in a schematic diagram of the operating principle with the essential features, and FIG. 2 a device for carrying out the method in a schematic representation.

FIG. 1 illustrates how a light band 4.1 as a laser line of a light source 4 used as a line laser is projected on a plane of the conveying device 1 perpendicular to a conveying direction, indicated with an arrow, of a bulk material 3 containing objects not completely absorbing laser radiation. At the same time, the objects 3.1 to be sorted lying on this plane are passed under the band 4.1.

In doing so, a first part 4.1.1 of the light produced by the light band 4.1 is reflected by one of the surfaces of the objects 3.1. A second part 4.1.2 enters the respective upper polygonal material geometry depending on the topological or polygonal composition of the surface of the individual object 3.1 at an entry point 3.1.1 and is then scattered to re-emerge at an exit point 3.1.2. This means that the light travels along a path under the surface of the material, and in a manner which is different to that of the prior art.

This propagation B of the light band, reflected and scattered in this manner, is determined at a height h of a measuring point M. In addition, in a grid R with a specific step size $B_w$, which is preferably 0.1 to 10 mm per segment, this propagation B is optically detected along the light band 4.1 by a camera 9 in accordance with the principle of laser triangulation or polygonization at a frequency of at least 100 Hz, resolved at a maximum value of 10 mm/pixel, preferably from 0.1 to 10 mm/pixel, and buffered in a location- and time-referenced manner as digital signals of a plurality of sequentially recorded rows $B_z$ and displayed in an image 10.

In these buffered rows $B_z$, contiguous regions are identified on the basis of adjustable thresholds for measured values as objects 3.1. The data from all measured values of the object image are then contiguously subjected to a statistical analysis and converted into feature values of the objects 3.1. An object image associated with the real object 3.1 is thus identified, by the boundaries of the real objects 3.1 being identified in the buffered image 10 by means of image processing methods.

Depending on pre-set sorting parameters for the feature values, a discharge unit 2 of the conveying device 1 is activated, which separates the bulk material 3 into at least two fractions, such as viable product and waste material of objects 3.1 of the bulk material 3.

In accordance with FIG. 2 the device comprises a conveying device 1 with first means 5 for sensor-based activation of a discharge unit 2. The light source 4, such as a line laser, generates the light band 4.1 as a laser line. Second means 6 detect the reflected and scattered propagation B (FIG. 1) in a definable width of the light band 4.1, and third means 7 buffer digital signals from several sequentially recorded rows in the image 10 in a location- and time-referenced manner. Fourth means 8 are used to identify contiguous regions on the basis of adjustable thresholds for measured values of the objects 3.1 as signals for sorting parameters, by means of which the first means 5 can be controlled.

To implement the method, the first to fourth means 5, 6, 7, 8 can each have at least one of the following elements, such as sensors 11, a module 12 for the grid R, a display 13 for displaying the image 10 and a computer unit 14 for using the program.

From the comparison
  of the prior art evaluated above, hence also the adverse effects resulting from US 2010 0 290 032 A1 and U.S. Pat. No. 6,914,678 B1, against the novel object of the invention developed therefrom and the disclosed invention as well as the preceding exemplary embodiment,
it becomes evident to a surprising degree that
due to the invention, a continuously illuminated laser strip is generated during the exposure in the visible spectrum with a constant wavelength,
by means of a camera working according to the principle of laser triangulation, thus a 2D-image sensor, the propagation of the entire laser line is detected quasi-simultaneously, for which purpose brightness differences in the camera image are used and
a geometric deflection of the laser light takes place on the surface and below the surface after its re-emergence, so that
as an overall resulting effect a row-by-row height detection and detection of the laser width is used as a so-called halo effect, in order to distinguish the objects in the material flow of the bulk material and, at the same time, to measure a height difference between the conveyor belt and the objects.

The invention thus differs in an advantageous way from the prior art, which in order to detect objects essentially teaches that on the one hand the colour of surfaces is used as a sorting criterion, and on the other hand the internal structure of an object is detected.

INDUSTRIAL APPLICABILITY

Since the invention offers a commercially advantageous solution for sensor-based individual grain sorting of surfaces of any desired bulk materials which are not identifiable in advance via the definition of coordinates on the grains by electronic polygonization, its widespread commercial application and industrial use is guaranteed.

LIST OF REFERENCE NUMERALS

1=Conveying device
2=discharge unit
3=bulk material
3.1=real object of the bulk material 3
3.1.1=entry point
3.1.2=exit point
4=light source, line laser
4.1=light band, laser line
4.1.1=first, reflected part of the light
4.1.2=second, scattered part of the light
5=first means for actuating the discharge unit 2
6=second means
7=third means
8=fourth means
9=camera
10=image
11=sensor
12=assembly for the grid R
13=display
14=computer unit
B=reflected and scattered propagation
$B_w$=reflected and scattered step width
$B_z$=recorded and buffered line
H=height of measuring point M
M=measuring point
R=grid

The invention claimed is:

1. A method for individual grain sorting of a plurality of objects (3.1) from bulk material (3), comprising the steps of:
  providing height distribution of the plurality of objects (3.1) on a conveying device (1) and propagating a light band (4.1) which illuminates in a temporally constant manner a polygonal surface of a single object (3.1) of the plurality of objects that cannot be identified in advance are used as sorting criteria,
  projecting the light band (4.1) on a plane wherein a first part (4.1.1) of the generated light is reflected from the surfaces of the single object (3.1) and a second part (4.1.2), depending on a topological or polygonal nature of the surface of the single object (3.1), enters a respective upper polygonal material geometry at an entry point (3.1.1), is then scattered and emerges again at an exit point (3.1.2), wherein the light travels along a path under the surface of the material,
  detecting reflected and scattered propagation (B) optically in a grid (R) having step size ($B_w$) per segment, along the light band (4.1) in a location- and time-referenced manner as digital signals from a plurality of sequentially recorded rows ($B_z$) according to a principle of laser triangulation or polygonization, resolved and determined at a height (h) of a measuring point (M),
  recording and displaying the detected reflected and scattered propagation (B) of the light band (4.1) as a buffered image (10), and identifying contiguous regions in the plurality of sequentially recorded rows ($B_z$) for measured values as an object image associated with the single object (3.1), and boundaries of the plurality of objects are identified in the buffered image (10),
  converting the data from all measured values of the object image of each of the plurality of objects (3.1) to feature values of the object images, and depending on pre-set sorting parameters for the feature values, activating a discharge unit (2) of the conveying device (1);
  wherein the individual grain sorting of the plurality of objects is performed from broken mineral ores, crushed and whole plastics from waste materials, bulk materials comprising comminuted wood on the conveying device (1), and comprising the steps of:
    a) projecting the temporally constantly illuminated light band (4.1) of a light source (4) at right angles to a conveying direction of the bulk material (3) on a plane of the conveying device (1), b) providing the plurality of objects (3.1) to be sorted on the plane and passing the plurality of objects (3.1) under the light band (4.1), c) providing the first part (4.1.1) of the light generated by the light band (4.1) which is reflected by the surfaces of the plurality of objects (3.1), and the second part (4.1.2), depending on the topological or polygonal nature of the surface of the single object (3.1), enters the respective upper polygonal material geometry at the entry point (3.1.1), is scattered and emerges again at the exit point (3.1.2), d) optically detecting the reflected and scattered propagation (B) in the grid (R) with the step size ($B_w$) per segment along the light band (4.1) by a camera (9) and buffered in a location- and time-referenced manner as digital signals from the plurality of sequentially recorded rows ($B_z$), wherein the propagation (B) of the light band (4.1) is detected by the camera (9) according to the principle of laser triangulation or polygonization, resolved with a maximum value of 10 mm/pixel and determined at the height (h) of the measuring point (M) and the detected reflected and scattered propagation (B) of the light band (4.1) is recorded at least row-by-row and at least in a time-referenced manner and displayed in buffered form in the buffered image (10), e) identifying in the plurality of sequentially recorded rows ($B_z$) the contiguous regions on the basis of adjustable thresholds for measured values as the object image (3.1.4) associated with the object (3.1), by the boundaries of the object being identified in the buffered image (10), f) contiguously subjecting the data from all measured values of the object image of the plurality of objects (3.1) to a statistical analysis and converting into feature values of the object images and thus also of the plurality of objects (3.1); and g) depending on pre-set sorting parameters, the discharge unit (2) of the conveying device (1) is activated, which separates the bulk material (3) into at least two fractions of the plurality of objects (3.1) of the bulk material (3).

2. The method according to claim 1, wherein the light source (4) is a line laser and a laser line provides the light band (4.1).

3. The method according to claim 2, wherein the step size ($B_w$) is from 0.1 to 10 mm per segment along the light band (4.1).

4. The method according to claim 3, wherein the resolution of the light band (4.1) is in the range of 0.1 to 10 mm/pixel.

5. The method according to claim 4, wherein the corresponding object image is identified in the buffered image (10) by image processing methods.

6. The method according to claim 4, further comprising the step of utilizing a surface sensor for the camera (9) which works according to the principle of laser triangulation.

7. The method according to claim 1, further comprising using a program as software for a computer unit (14) controlling the method by, providing at least one of:

the optical detection of the propagation of the light reflected or scattered by the surfaces of the plurality of objects (3.1) in the grid with a specific step size along the light band (4.1), or the location and time-referenced buffering in the plurality of sequentially recorded rows as the digital signals, or the identification of the contiguous regions in the sequentially recorded rows ($B_z$) and analysis based on the adjustable thresholds of the measured values as the object images, and control of the discharge unit (2) for separating the plurality of objects (3.1) into fractions, in which functions, data or features for using the light source (4) as a line laser with light band (4.1) of the line laser, the step sizes ($B_w$) and the plurality of sequentially recorded rows ($B_z$), the heights (h) of the measuring point (M) and time-referenced recording, buffering and display in the buffered image (10) are integrated in dimensioned or digitized form.

8. A device for individual grain sorting of a plurality of objects (3.1) from bulk material (3) including broken mineral ores, crushed and whole plastics from waste materials, comminuted wood, the device comprising:

a conveying device (1) providing height distribution of the plurality of objects (3.1), a light source (4) with a stationary optical element for beam shaping and for generating a light band (4.1) which is implemented as a laser line on a plane of the conveying device (1) at right angles to a conveying direction of the bulk material (3), the light band (4.1) illuminates in a temporally constant manner a polygonal surface of a single object (3.1) of the plurality of objects that cannot be identified in advance are used as sorting criteria;

the light band (4.1) having a first part (4.1.1) in which the projected light is reflected from the surfaces of the single object (3.1) and a second part (4.1.2), depending on a topological or polygonal nature of the surface of the single object (3.1), enters a respective upper polygonal material geometry at an entry point (3.1.1), is then scattered and emerges again at an exit point (3.1.2), wherein the light travels along a path under the surface of the material, a detector (6) for detecting reflected and scattered propagation (B) in a grid (R) having step size ($B_w$) per segment of the light band (4.1) at least row-by-row and in a location- and time-referenced manner as digital signals from a plurality of sequentially recorded rows ($B_z$) according to a principle of laser triangulation or polygonization using a camera (9), resolved with a maximum value of 10 mm/pixel and determined at a height (h) of a measuring point (M), a buffer (7) for buffering the location- and time-referenced digital signals from the plurality of sequentially recorded rows ($B_z$) and display in a buffered image (10), identifier (8) for identifying contiguous regions on a basis of adjustable thresholds for measured values of the buffered image (10) associated with the plurality of objects, by boundaries of the plurality of objects (3.1) being identified in the buffered image (10), a computer unit (14) using statistical analysis to convert the measured values of the buffered image (10) into feature values of the buffered image of the plurality of objects, and a sensor-based actuator (5) for activating the discharge unit (2) depending on pre-set sorting parameters for the feature values to separate the bulk material (3) into at least two fractions the plurality of objects of the bulk material (3), wherein the actuator (5), the detector (6), the buffer (7) and the identifier (8) each have at least one of a sensor (11), a module (12) for the grid (R), the computer unit (14) for recording values, processing/analysis of the recorded values into data and output of signals and for application of a program, and the camera (9).

\* \* \* \* \*